UNITED STATES PATENT OFFICE 2,598,770

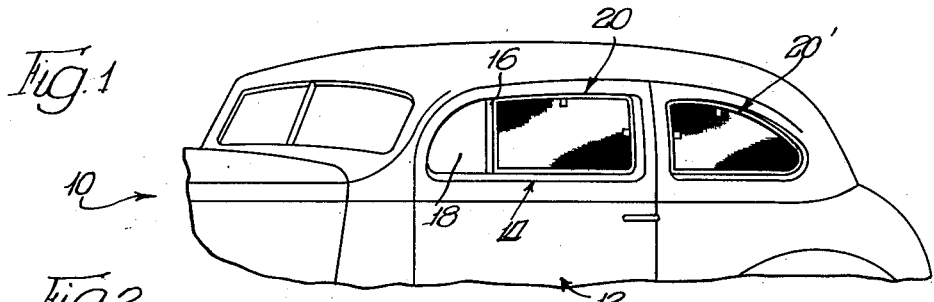
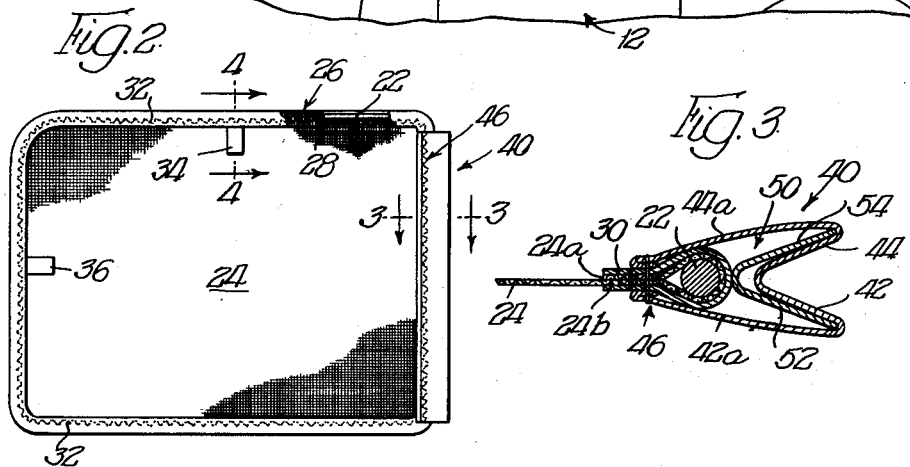
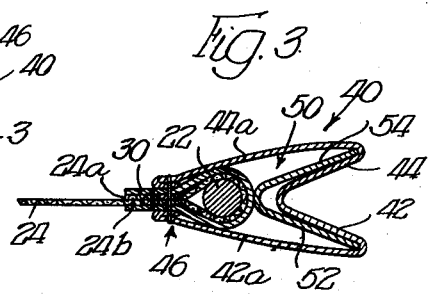
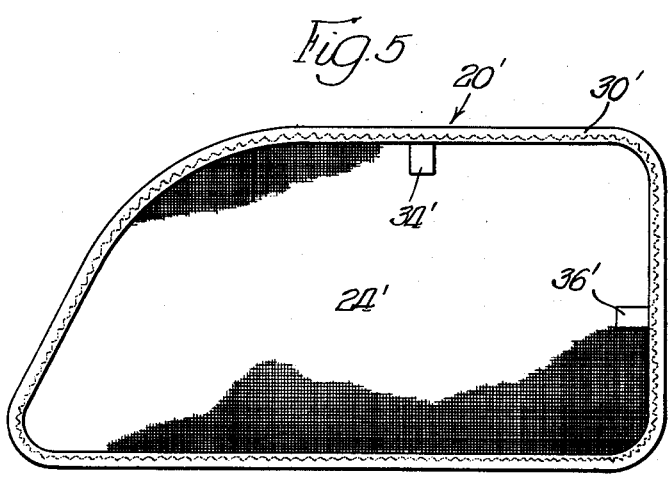
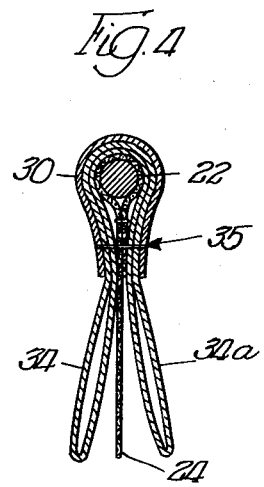
INVENTOR.
Stanley F. Drozt,

FLEXIBLE WINDOW SCREEN

Stanley F. Drozt, Chicago, Ill.

Application June 22, 1948, Serial No. 34,483

3 Claims. (Cl. 160—105)

My invention relates to window screens and more particularly to window screens adapted for use in windows of automotive vehicles, or the like, which have a slot or channel disposed in the frame.

During warm or hot weather the driver and passengers of an automobile, for example, may lower, or otherwise open, the windows in order to be cooled by the circulation of air through the interior of the car body. During certain seasons of the year this is accompanied by certain discomforts and, in some cases, dangers by reason of insects entering through the windows. Flies and mosquitoes, while not generally dangerous, are undesirable, particularly if there are infants in the automobile. On the other hand, bees, wasps, hornets and the like are very dangerous, since they may sting the driver and cause him to lose control of the automobile. Insects generally, or even leaves and scraps of paper, if they enter the car and interfere with the driver's vision, may result in automotive accidents which can involve not only the vehicle in question but also others which may be parked or driven on the road in proximity to the one which goes out of control.

To eliminate the foregoing discomforts, inconveniences and dangers, I provide window screens for automotive vehicles which will prevent the entry of insects or other objects which would interfere with the comfort and safety of the passengers and driver. Although other forms of vehicle window screens have been proposed, their construction has been such that they require fastening means, such as clips or the like, for securing the screen in place. Use of fasteners consumes time and, if the fasteners are mislaid or lost, renders the screen useless. Other forms of proposed screens rely upon positioning the window glass in a particular manner for securing the screen in place or for removing it. Some of the screens previously proposed may be inserted only from one side of the frame.

By my invention I provide a window screen which can be easily and quickly introduced or removed from a window frame from either side of the frame and which requires no extraneous parts, such as clips, pins, snaps or the like, to retain it securely in place. The screen is made to conform generally in outline to the shape of the inside of an automobile window frame which has an interior channel, in which channel the window glass is guided. However, the screen's dimensions are greater than the inner dimensions of the window frame itself and preferably slightly smaller than the dimensions of the space provided by the channel in the frame. In its completely open position the top of the window glass of a vehicle window usually lies slightly below the bottom portion of the frame, so that a channel is provided all around the central interior surface of the window frame. By temporarily deforming the screen of my invention, which screen is flexible and has a resilient frame, it may be inserted in the channel of the window frame when the window glass is run all the way down. Then, when in place in the channel of the frame, the screen may be released and its resiliency returns it to its original flat shape and it is securely held in place in the channel of the window frame.

In order successfully to provide a screen which is larger than the window frame, so that it must be deformed in two directions to position it in the channel of the window frame, a resilient frame must be employed and the mesh screen (screening) which is connected with it should be adapted to be flexed simultaneously in transverse directions without taking a set. In the preferred form of my invention, therefore, I employ plastic mesh screen which may be deformed in a plurality of directions at the same time without taking any set. Metal mesh screening, on the other hand, cannot be so flexed or deformed without damage to the appearance or structure of the screen. A further advantage in employing plastic mesh screening is that it is weather resistant, non-corrosive and more resilient than metal screen.

In the preferred form of my invention, I employ an endless resilient frame member and overlay a sheet of plastic mesh screen, the edge of which passes over the frame and is turned back upon the body of the screen a short distance, so that a double layer of screen exists adjacent the frame. Then I employ a plastic binding tape over the frame and inwardly thereof a distance to cover the overlapped mesh screening. Stitching through the tape and underlying portions of the mesh screen secures the screen and tape together and connects them with the frame. I prefer to employ zig-zag stitching so that the points of entry and egress of the thread with respect to the tape and screen are not in a continuous line but are, instead, off-set from each other periodically. The thread employed is preferably rot-resistant and may, for example, be nylon thread. When I refer to "plastic" binding tape, this is intended also to include binding tape which is plastic coated.

In one form of the invention wherein the screen is adapted to be used in an automobile window frame which includes a post—such as may be employed in window frames for separating and guiding both a rotatable vent and a vertically movable window glass—I provide means for embracing the post along one edge of the screen, said screen fitting into the frame wherein the vertically movable glass is located. Said means is channel shaped and is adapted to have its open side adjustable for varying sizes of posts.

It is another object of the invention to provide a window screen which is less expensive to produce by reason of the reduced number of parts and reduced number of manufacturing steps necessary for assembling the parts.

Other objects, uses and advantages of the invention will be obvious or will appear from the following written description when taken with the drawings in which:

Figure 1 is a fragmentary, perspective view of a passenger vehicle showing window screens of my invention installed in two forms of window frames of said vehicle;

Figure 2 is an enlarged view showing the inner side of one form of window screen of my invention;

Figure 3 is an enlarged cross-sectional view on the line 3—3 of Figure 2;

Figure 4 is an enlarged fragmentary view on the line 4—4 of Figure 2; and

Figure 5 is a view, on substantially the same scale as Figure 2, showing the inner side of another form of window screen embodying my invention.

Referring now to Figures 1, 2, 3 and 4, there will be seen an automotive vehicle 10 having a vehicle door 12 in which there is disposed a window frame 14. A post 16 separates the window space of frame 14 into two portions, in one of which is positioned a vent window glass 18, which may be rotatable about a vertical axis, and in the other of which may be positioned a window glass which is movable vertically within the usual guide channel (not shown) disposed generally centrally within the window frame 14.

A window screen 20 is shown to the right of post 16, as seen in Figure 1, and permits the flow of air into and out of the passenger compartment, since the window glass is all the way "down." As may be seen more clearly from Figures 2, 3 and 4—wherein screen 20 is viewed from the "inner," or passenger, side—the screen 20 comprises a resilient frame member 22, which preferably is formed as an endless loop, to which is connected mesh screening 24 of a type which may be flexed in a plurality of directions at the same time, including directions at right angles to each other, without taking a set. The frame 22 may, for example, be made of 1/8" metal wire which has its ends joined, as by welding. In its preferred form the mesh screen 24 is made of plastic material, since it may be flexed simultaneously in a plurality of directions without taking a set or becoming damaged, and its edge 28 is brought over the frame and back upon the body of the screen adjacent the frame, as shown at 26 where the binding tape has been cut away to show the edge 28 of the screen 24 and the frame 22. The screen could then have its two layers 24a and 24b (see Figure 3) connected directly together by stitching, for example, which extends all the way around the screen and adjacent the frame 22, in order to secure the mesh screen 24 to the frame.

However, in order to give a more finished appearance, a binding tape 30 is disposed over the frame 22 and inwardly thereof over the double layer of mesh screen adjacent the frame. The binding tape 30 is preferably formed of plastic or plastic coated material so that it will be flexible, strong, durable and weather resistant. The binding tape not only gives a better appearance to the screen, since it conceals the edge 28 of the screen 24, but it also strengthens the connection between the mesh screen and frame 22, particularly when stitching is employed for securing the mesh screen to the frame, since the thread passes through and bears against both the screen and tape.

In the preferred form of my invention I employ zig-zag stitching 32 in order to offset the points of stress between the thread and the tape and mesh screen. However, straight line stitching may be employed. If desired, the two layers 24a and 24b of the mesh screen may first be stitched together and then the tape 30 and two layers may be stitched together by a second series of stitches. Preferably, a strong thread having rot-resistant qualities is employed. I have found nylon thread to be satisfactory in those respects.

As previously mentioned, the outside measurements of the screen 20 are such as to exceed the inner measurements of the window frame 20 so that the screen must be deformed from the flat shape which its resilient frame gives it. Since both the heighth and width of the screen 20 exceed the inner height and width of frame 14, it is necessary to deform the screen in two directions, and this may be accomplished by positioning a corner or a portion of one side of the screen in the usual guide channel of the window frame, after the window is fully lowered, and then gripping the tabs 34 and 36 with separate hands and flexing or springing the screen into smaller dimensions than the window frame. While thus flexing or deforming the screen and gripping the tabs 34 and 36, the screen may be moved into the guide channel of the window frame. Release of the tabs will then permit the resilient frame 22 to resume its original, flat shape. The screen will then be held securely in the channel of the window frame along all edges, the dimensions of which channel equal or exceed the dimensions of the screen 20. Removal of the screen is easily accomplished by reversing the procedure just mentioned.

Since a second pair of tabs (see, for example, tab 34a of Figure 4) preferably is located on the outer side of screen 20, the screen may be put in place or removed either from inside or outside the passenger compartment. As shown in Figure 4 the tabs 34 and 34a are stitched to the binding tape 30 and mesh screen 20 as at 35 and, preferably, are formed of a double layer of plastic material which passes from one side of the screen over the frame 22 to the other side. In that fashion each tab provides a loop into which a finger may be inserted.

The foregoing description, so far as it goes, of the screen 20, also applies to screen 20' of Figure 5, which latter screen is constructed and employed in the manner set forth above. Corresponding parts are indicated by the same reference numerals with the addition to said numbers of a prime ('). Screen 20' is also quadrangular in shape but has an outline corresponding to, but slightly larger than, the frame 14' of vehicle 10. From screen 20' it will be appreciated that screens of my invention may be made in various shapes in order to fit the varying shapes of windows of different makes of automotive vehicles.

Where the window frame, such as frame 14, includes a post, such as post 16, I may provide a channel shaped member, indicated generally by the reference numeral 40, along one side of the screen 20. The channel shaped member is adapted to fit about or embrace the sides of post 16 of frame 14 in order to form a tight joint when the post does not provide in itself an adequate channel, for receiving the edge of the screen 20. Of course, when the post 16 has a channel in it which will accommodate one side of a screen, in conjunction with the guide channel in the window frame 14, then a screen without the channel shaped member may be employed. Assuming for purposes of description that the post 16 lacks an adequate channel, it will be seen from Figures 2 and 3 that the legs 42 and 44 of channel-shaped member 40 of screen 20 open outwardly and away from the screen and then turn back upon themselves, as at 42a and 44a, respectively, and connect with opposite sides of the screen 20, as by being stitched to the binding tape 30 and mesh screen 24 as indicated at 46. Legs 42 and 44 are flexible and preferably formed of plastic or plastic coated material. It will be noticed that the two ends (upper and lower) of the member 40 do not extend to the top and bottom edges of the screen 20. That permits the top and bottom portions of screen 20 to fit within the channel of the window frame 14 while permitting the member 40 to extend for the full height of post 16 and thereby provide a tight joint without being folded over or deformed at its ends, since the channel shaped member 40 does not fit in any channel of the window frame. The connection between member 40 and screen 20 is of a hinged nature and permits easier insertion or removal of the screen.

The member 40 includes an insert comprising a channel-shaped reinforcing member 50 which is substantially rigid longitudinally but which is sufficiently flexible that its legs 52 and 54 may be spread apart or forced together to accommodate the whole channel-shaped member 40 to varying sizes of posts. Reinforcing member 50 may have a friction fit within the space defined between the edge of the screen 20 and the legs 42 and 44. As member 40 is pressed into place about a post, such as post 16, when the screen 20 is being inserted in the window frame 14, the arms 42 and 44, as well as arms 52 and 54 of the reinforcing member, will tend to be forced into gripping relationship with the post.

Although the screen of my invention has been described primarily in connection with the window of a vehicle door, it will be understood that any such reference to location is merely by way of example since the screen may be employed in connection with windows in other portions of a vehicle body. It will also be appreciated that the screen of my invention may be employed elsewhere than in vehicles. Consequently, I do not intend to be limited to the exemplified uses or form of construction—since various uses and changes in structure will be suggested by my disclosure to those skilled in the art—except insofar as required by the state of the prior art.

I claim:

1. In combination, a resilient endless frame member generally quadrangular in shape, a flexible plastic mesh screen, said frame and screen each being formed of material which may be simultaneously flexed in transverse directions without taking a set, and a plastic binding tape overlying the frame and adjacent peripheral portions of the mesh screen, said tape, screen and frame being interconnected, and a channel-shaped member pivotally connected with one side of said frame and extending in a direction away from the screen, said channel-shaped member being formed of flexible plastic material and having a semi-rigid reinforcing member.

2. A screen for a vehicle door window which includes a post and a frame which has a channel therein, said screen comprising an endless loop of generally quadrangular outline, plastic mesh screen overlying the frame and having its margins turned back over the frame and upon the body of the screen, a plastic binding tape disposed over the frame on both sides of the adjacent portions of the plastic mesh screen, a flexible plastic channel-shaped member on the outer side of that portion of the frame which is adapted to be positioned adjacent said post, said channel-shaped member having its legs turned back upon themselves and being pivotally connected with an adjacent portion of the flexible binding tape, and a channel-shaped member secured within the flexible plastic channel-shaped member to reinforce the latter, said reinforcing channel-shaped member being adapted to have its sides adjustable toward and away from each other, whereby the channel shaped member may embrace different sizes of posts.

3. In combination, a resilient frame, a flexible mesh screen which is formed of material which may be flexed in a plurality of directions at the same time without taking a set and which is connected with the frame, and a flexible channel-shaped member having a bight portion with the bight portion of the member being spaced from the frame and with the outwardly extending arms of said member being bent back upon themselves and pivotally connected with one side of said frame, reinforcing means disposed between the frame and said arms, said reinforcing means being channel-shaped and substantially rigid longitudinally but having its free margins flexible toward each other, whereby the arms of said flexible channel-shaped member may flex towards each other in a gripping action when the bight portion is urged toward the frame.

STANLEY F. DROZT.

REFERENCES CITED

The following references are of record in the file of this patent:

UNITED STATES PATENTS

| Number | Name | Date |
|---|---|---|
| 690,662 | Perrin | Jan. 7, 1902 |
| 1,091,849 | King | Mar. 31, 1914 |
| 1,712,341 | Fisher | May 7, 1929 |
| 1,756,227 | Torrent | Apr. 29, 1930 |
| 1,782,173 | Nicholson | Nov. 18, 1930 |
| 1,977,165 | Williams | Oct. 16, 1934 |
| 2,193,469 | Ashton | Mar. 12, 1940 |
| 2,297,729 | Thomas | Oct. 6, 1942 |